United States Patent
Lefevre et al.

(10) Patent No.: US 12,139,167 B2
(45) Date of Patent: Nov. 12, 2024

(54) MULTI-LAYER AUTONOMOUS VEHICLE CONTROL ARCHITECTURE

(71) Applicant: Coast Autonomous, Inc., Pasadena, CA (US)

(72) Inventors: Pierre Michel Lefevre, Clearwater, FL (US); Cyril Gael Royere, Compiègne (FR)

(73) Assignee: COAST AUTONOMOUS, INC., Pasadena, CA (US)

( * ) Notice: Subject to any disclaimer, the term of this patent is extended or adjusted under 35 U.S.C. 154(b) by 204 days.

(21) Appl. No.: 17/480,711

(22) Filed: Sep. 21, 2021

(65) Prior Publication Data

US 2022/0089187 A1 Mar. 24, 2022

Related U.S. Application Data

(60) Provisional application No. 63/081,473, filed on Sep. 22, 2020.

(51) Int. Cl.
*B60W 60/00* (2020.01)
*B60W 50/029* (2012.01)

(52) U.S. Cl.
CPC ...... *B60W 60/0015* (2020.02); *B60W 50/029* (2013.01); *B60W 2050/0292* (2013.01);
(Continued)

(58) Field of Classification Search
CPC . B60W 2050/0091; B60W 2050/0292; B60W 2420/42; B60W 2420/52;
(Continued)

(56) References Cited

U.S. PATENT DOCUMENTS

2014/0188364 A1 7/2014 Kang
2020/0184324 A1* 6/2020 Stepp .................. B60W 30/09
(Continued)

FOREIGN PATENT DOCUMENTS

CN 108196547 6/2018
EP 3664064 A1 * 6/2020 ............. B60Q 1/249
(Continued)

OTHER PUBLICATIONS

International Search Report and The Written Opinion of International Application No. PC/US2021/051391 dated Jul. 1, 2022.

*Primary Examiner* — Babar Sarwar
(74) *Attorney, Agent, or Firm* — PROSPERA LAW, LLP

(57) ABSTRACT

A system for controlling an autonomous vehicle is provided. The system may include a first sensor system including a first sensor and a first data box. The first sensor system may be configured to determine a first vehicle control decision. The system may further include a second sensor system including a second sensor and a second data box. The second sensor system may be configured to determine a second vehicle control decision. The system further includes a controller configured to receive the first vehicle control decision and the second vehicle control decision from the first sensor system and the second sensor system; determine a priority ranking for the first vehicle control decision and the second vehicle control decision; select, based on the priority ranking, a vehicle control decision from the first vehicle control decision and the second vehicle control decision; and implement, responsive to the determining, the selected vehicle control decision.

17 Claims, 11 Drawing Sheets

(52) U.S. Cl.
CPC . *B60W 2420/403* (2013.01); *B60W 2420/408* (2024.01); *B60W 2556/10* (2020.02); *B60W 2710/20* (2013.01); *B60W 2720/10* (2013.01); *B60W 2720/12* (2013.01)

(58) Field of Classification Search
CPC ......... B60W 2556/10; B60W 2556/35; B60W 2710/20; B60W 2720/10; B60W 2720/12; B60W 30/09; B60W 50/029; B60W 60/0015; G01S 13/865; G01S 13/867; G01S 13/931; G01S 17/86; G01S 17/931; G01S 2013/9318; G01S 2013/93185; G01S 2013/9319; G01S 2013/9321; G01S 2013/9323; G01S 2013/9324
See application file for complete search history.

(56) References Cited

U.S. PATENT DOCUMENTS

| | | | |
|---|---|---|---|
| 2020/0202168 A1* | 6/2020 | Mao | G06V 10/809 |
| 2021/0271906 A1* | 9/2021 | Creusot | G06V 20/584 |
| 2021/0339742 A1* | 11/2021 | Chang | B60W 30/09 |
| 2022/0017113 A1* | 1/2022 | Han | G05D 1/246 |
| 2022/0032924 A1* | 2/2022 | Jeihani | B60W 40/09 |

FOREIGN PATENT DOCUMENTS

| | | |
|---|---|---|
| JP | 2019067159 | 4/2019 |
| WO | 2019239395 | 12/2019 |

* cited by examiner

MULTI-LAYER AUTONOMOUS VEHICLE CONTROL ARCHITECTURE

CROSS-REFERENCE TO RELATED APPLICATIONS

The present application claims the benefit of U.S. Provisional Patent Application Ser. No. 63/081,473, filed on Sep. 22, 2020, the entire disclosure of which is incorporated herein in its entirety by reference.

TECHNICAL FIELD

The subject matter described herein relates generally to control systems and, more specifically, to multi-layered autonomous vehicle control architecture.

BACKGROUND

Autonomous and semi-autonomous vehicles have the potential to be used in a number of applications. For example, the use of autonomous vehicles may be desirable in military or civilian applications that may otherwise expose human operators, passengers, or property to dangerous environments. Such autonomous vehicles may include a control system configured to receive information regarding, for example, the surrounding terrain, upcoming obstacles, a particular path, etc., and to automatically respond to this information in place of a human operator by commanding a series of maneuvers so that the vehicle is able to negotiate the terrain, avoid the obstacles, or track a particular path with little or no human intervention.

SUMMARY

Systems, methods, and articles of manufacture, including computer program products, are provided for vehicle control. In one aspect, there is provided a system. The system may include at least one data processor and at least one memory. The at least one memory may store instructions that result in operations when executed by the at least one data processor. The operations may include active and or passive driving assistance systems for vehicles, safety system for mobile machines, controlling any type of mobile machine or vehicle to move tools, parts, and people.

The system may include a first sensor system including a first sensor and a first data box. The first sensor system may be configured to determine a first vehicle control decision. The first vehicle control decision modifying a function or operation of the vehicle. The system may further include a second sensor system including a second sensor and a second data box. The second sensor system may be configured to determine a second vehicle control decision. The second vehicle control decision modifying a function or operation of the vehicle. The system may further include a controller configured to receive the first vehicle control decision and the second vehicle control decision from the first sensor system and the second sensor system. The controller may further be configured to determine a priority ranking for the first vehicle control decision and the second vehicle control decision. The controller may further be configured to select, based on the priority ranking, a vehicle control decision from the first vehicle control decision and the second vehicle control decision. The controller may further be configured to implement, responsive to the determining, the selected vehicle control decision.

In some variations, one or more features disclosed herein including the following features may optionally be included in any feasible combination. For example, implementing the selected vehicle control decision may include changing a speed or a steering direction of the vehicle. The system may further include a safety control system configured to generate, responsive to a sensor detecting an object within a threshold distance of the vehicle, a third vehicle control decision. The third vehicle control decision may be configured to stop the vehicle. The first data box may be configured to process data from the first sensor. The first data box may be configured to detect one or more objects within a range of the first sensor. The first data box may be configured to construct, responsive to the detecting, a dynamic obstacle map including detected one or more objects. The first data box may be configured to determine, responsive to the constructing and based on a first algorithm, the first vehicle control decision, the vehicle control decision modifying a function or operation of the vehicle.

The second data box may be configured to process data from the second sensor. The second data box may be configured to detect one or more objects within a range of the second sensor. The second data box may be configured to construct, responsive to the detecting, a dynamic obstacle map including detected one or more objects. The second data box may be configured to determine, responsive to the constructing and based on a second algorithm, the second vehicle control decision, the second vehicle control decision modifying a function or operation of the vehicle. The first algorithm may differ from the second algorithm. The controller may be further configured to determine the priority ranking based on a historical performance of the first sensor system, the second sensor system, the third sensor system, and/or an environment of the vehicle. The first vehicle control decision may be based on data detected by the first sensor. The second vehicle control decision is based on data detected by the second sensor. The first sensor may include a static LIDAR sensor, a spinning LIDAR sensor, an optical sensor, a radar sensor, a motion sensor, and/or a camera. The second sensor may include a spinning LIDAR sensor, a static LIDAR sensor, an optical sensor, a radar sensor, a motion sensor, and/or a camera. The threshold distance may be based on a speed of the vehicle.

Implementations of the current subject matter may include, but are not limited to, methods consistent with the descriptions provided herein as well as articles that include a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which may include a non-transitory computer-readable or machine-readable storage medium, may include, encode, store, or the like one or more programs that cause one or more processors to perform one or more of the operations described herein. Computer implemented methods consistent with one or more implementations of the current subject matter may be implemented by one or more data processors residing in a single computing system or multiple computing systems. Such multiple computing systems may be connected and may exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to automated vehicles, advanced driver-assistance systems, machines, or the like, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

When practical, similar reference numbers denote similar structures, features, or elements.

DETAILED DESCRIPTION

Use of autonomous or semi-autonomous vehicle control systems continues to increase. As additional sensor and control systems become available, implementing functions with upgraded capabilities, etc. can require a complete re-working of the vehicle control architecture. In general, one or more controllers of various subsystems in a vehicle are required to communicate with other subsystems to assist in proper vehicle control. For example, the communication may enable the subsystems to share information, in turn facilitating a subsystem to react to actions being taken by other subsystems automatically.

In addition, increasing vehicle safety requirements may influence implementing system redundancy to achieve higher safety levels. Redundancy may be achieved by including one or more backup (or second) components or systems for taking over operations in case a primary (or first) component or system experiences a failure. The redundant component(s) may assume the burden of the operations of an electronic steering system or vehicle control system for a limited amount of time.

Figure 1:
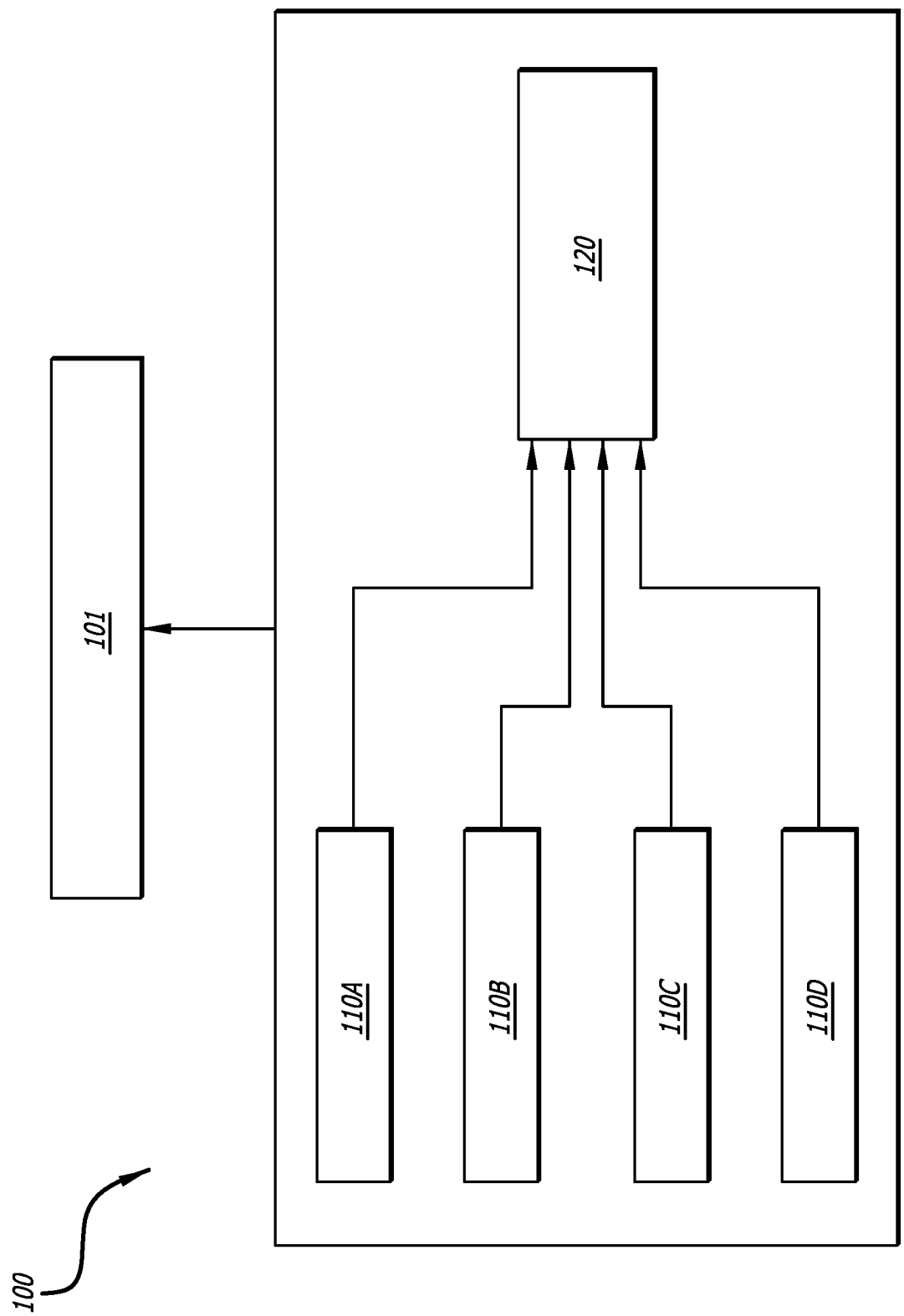
FIG. 1 depicts an example vehicle control system in which features consistent with the described subject matter may be implemented.

For example, conventional vehicle control systems communicate with one or more sensors that detect and measure observable conditions of the vehicle itself and/or one or more functions controlling vehicle movement (e.g., steering, propulsion, braking, etc. FIG. 1 depicts an example vehicle control system 100, in accordance with some example implementations. As shown in FIG. 1, the vehicle control system 100 includes sensors 110A-110D which feed into a sensor data box 120 and a vehicle control system component 101. The sensor data box 120 may be configured to receive sensor data from the sensors 110, process the sensor data, and/or make vehicle control decisions based on an analysis of the sensor data. The sensors 110 may include a light detection and ranging (LIDAR) sensor, an optical sensor, a GPS sensor, an inertial sensor, and/or the like. The sensor data box 120 may also transmit the sensor data and/or the vehicle control decisions to the vehicle control system component 101. The vehicle control system component 101 may be configured to implement vehicle control decisions (e.g., change a steering heading, change the speed of the vehicle, change in operation of the vehicle, or the like).

In some aspects, the vehicle control system 100 may implement artificial intelligence to determine and/or predict vehicle control decisions based on the sensor data. As shown, since all sensors 110 are fed into the same sensor box 120, multiple points of failure (e.g., a failure in any one of the sensors 110 or components thereof) may incapacitate the vehicle control system 100. Further, any change to one or more sensors 110 may affect the entire control system algorithm and any sensor 110 or component upgrades may require a system overhaul and adjustment to account for any changes. The vehicle control system 100 may be referred to as a single layer control topology or architecture in that all sensor data for the control system are organized around a solitary data box 120.

Implementations described herein relate to a multi-layered vehicle control system topology that may address some of the issues discussed above with the single-layer vehicle control system. The multilayer topology may provide redundant control and safety in that each layer may be configured to obtain sensor data and operate the vehicle independently from other sensor data or components. The multilayer control system also results in no single point of failure since each layer is capable of operating the vehicle, failures in other systems or layers will not incapacitate the vehicle. Additionally, sensors in the multilayer vehicle control system may be upgraded without affecting the entire control system algorithm. Further, by having independent control system layers associated with corresponding sensors, less processing power may be required versus a single layer system as described herein. For example, the multilayer vehicle control system may beneficially consume up to 20 times less processing power than a single level control system. The beneficial less processing power may occur because each layer (e.g., each sensor system 225) of the vehicle control system may preprocess sensor data to make an independent vehicle control decision that is outputted to a vehicle controller rather than have the controller process data from each sensor to make a vehicle control decision.

Figure 2:
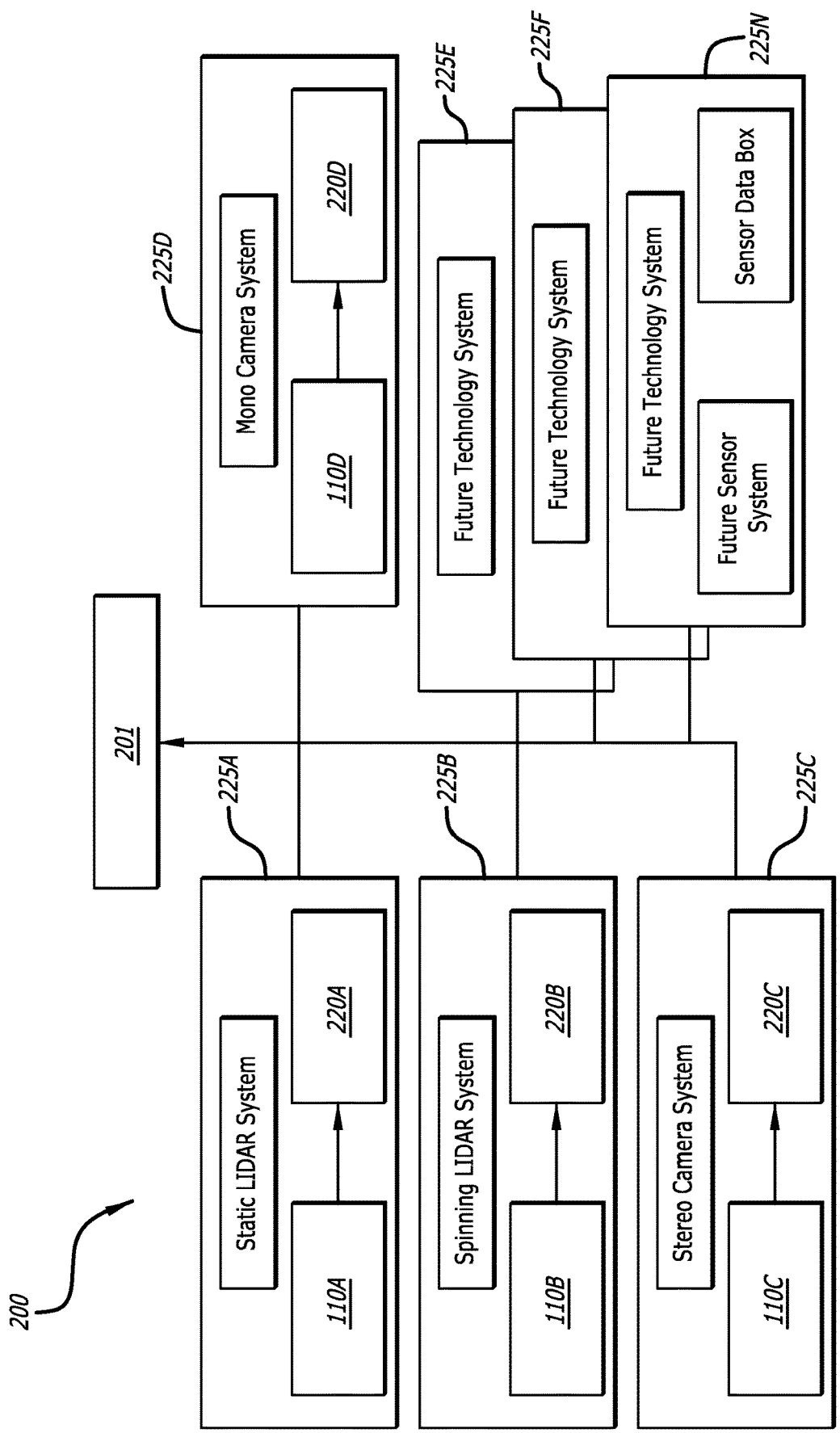
FIG. 2 depicts a functional block diagram of a multi-layered vehicle control system, in accordance with some example implementations.

FIG. 2 depicts a functional block diagram of one embodiment of a multi-layered vehicle control system 200 in which features consistent with the described subject matter may be implemented. As illustrated, the system 200 may include sensor systems 225A-225N (e.g., layers). As shown, each sensor system 225 includes a sensor 110 and a corresponding sensor data box 220. Sensors 110 each provide data to an independent system (e.g., sensor system 225) that can control (and drive) the vehicle independently (e.g., by sending signals and/or control decisions to a vehicle control system component 201). The sensors 110 may include sensors internal or external (e.g., remote) to the vehicle or the sensors 110 (including, but not limited to, software, processor, and a memory). For example, external sensors may include traffic cameras, sensors, or the like positioned remote to the vehicle and in communication with the vehicle (e.g., via the vehicle control system component 201 or other vehicle communication component). The vehicle control system component 201 may be configured to implement vehicle control decisions (e.g., change a steering heading, change the speed of the vehicle, change in operation of the vehicle, or the like). Each layer (e.g., sensor system 225) may use different algorithms to provide software redundancy as well. For example and with reference to FIG. 2, sensor systems 225A, 225B, 225C, . . . 225N, etc., may each have their own memory and processor running different software and/or algorithms to generate the individual vehicle control decision of each sensor system 225. The different software and algorithm provides redundancy in that if a single software or algorithm has a defect (e.g., crashes), the entire vehicle control system 200 will not be disabled and will rely on remaining sensor systems 225 software algorithms to determine the vehicle control decision to implement.

Further, the example of FIG. 2 includes future technology sensor systems 225E, 225F, and 225N which demonstrates that the multilayered vehicle control system 200 can be adapted to include new or upgraded sensor technology without affecting the entire control system algorithm. Additionally, as noted above, the vehicle control system 200 provides a robust and safe control system that is able to process a large amount of data from various sensors and a failure in one or more sensor systems 225 or sensor components will not incapacitate the vehicle.

Figure 3:
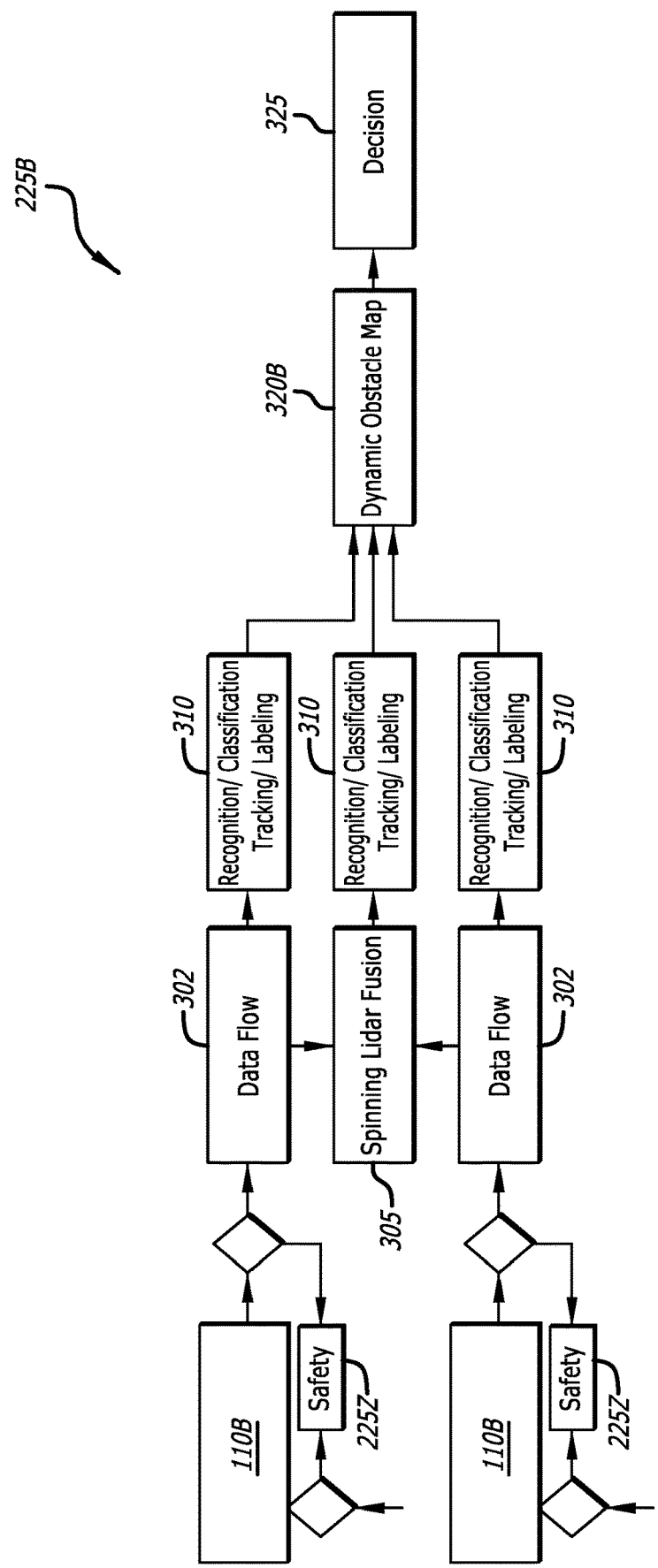
FIG. 3 depicts a functional block diagram of an example sensor system, in accordance with some example implementations.

FIG. 3 depicts a functional block diagram of an example sensor system 225B in which features consistent with the described subject matter may be implemented. As shown, the sensor system 225B includes sensors 110B (such as, but not limited to, spinning LIDAR sensors). The sensors 110B may output data flows 302. At 305, a processor of the sensor system 225B may combine or fuse data flows 302 from the sensors 110B. At 310, the sensor system 225B may apply recognition, classification, tracking, and labeling processing to the data flows 302 and/or the combined data flow 305. The recognition, classification, tracking, and labeling processing may implement artificial intelligence to learn to recognize, classify, track, and label objects detected by the sensors 110B. The outputs of 310 may be fed into a dynamic obstacle map component 320B. The dynamic obstacle map provides a 2D bird's eye view of stationary and moving obstacles that is used to dynamically define the path of the moving obstacles. The dynamic obstacle map component 320B may be configured to receive the recognition, classification, tracking, and labeling data and construct a dynamic obstacle map within a perception area of the sensors 110B. The dynamic obstacle map may include a number of potential obstacles along a route or field-of-view for the vehicle based on the data generated by the sensors 110A. After constructing the dynamic obstacle map, the sensor system 225B (e.g., the sensor data box 220B) may output a decision 325. The decision 325 may include a vehicle control decision which may be transmitted to the vehicle control system component 201 to implement the vehicle control decision (e.g., change a steering heading, change the speed of the vehicle, change an operation of the vehicle, or the like). As further illustrated in FIG. 3, the outputs of the sensors 110B may also be fed into a safety sensor system 225Z. The sensor system 225Z may provide an emergency failsafe to stop the vehicle if an object is detected within a perception area (e.g., an emergency area) less than a threshold distance away from the vehicle (such as, but not limited to, within 5-30 feet of a front bumper). As those skilled the art will appreciate, the threshold distance may be less than 5 feet or the threshold distance may be varied depending on traffic density, weather, number of obstacles, and location (e.g., lower threshold distance in and around a destination (e.g., bus stop).

Figure 4:
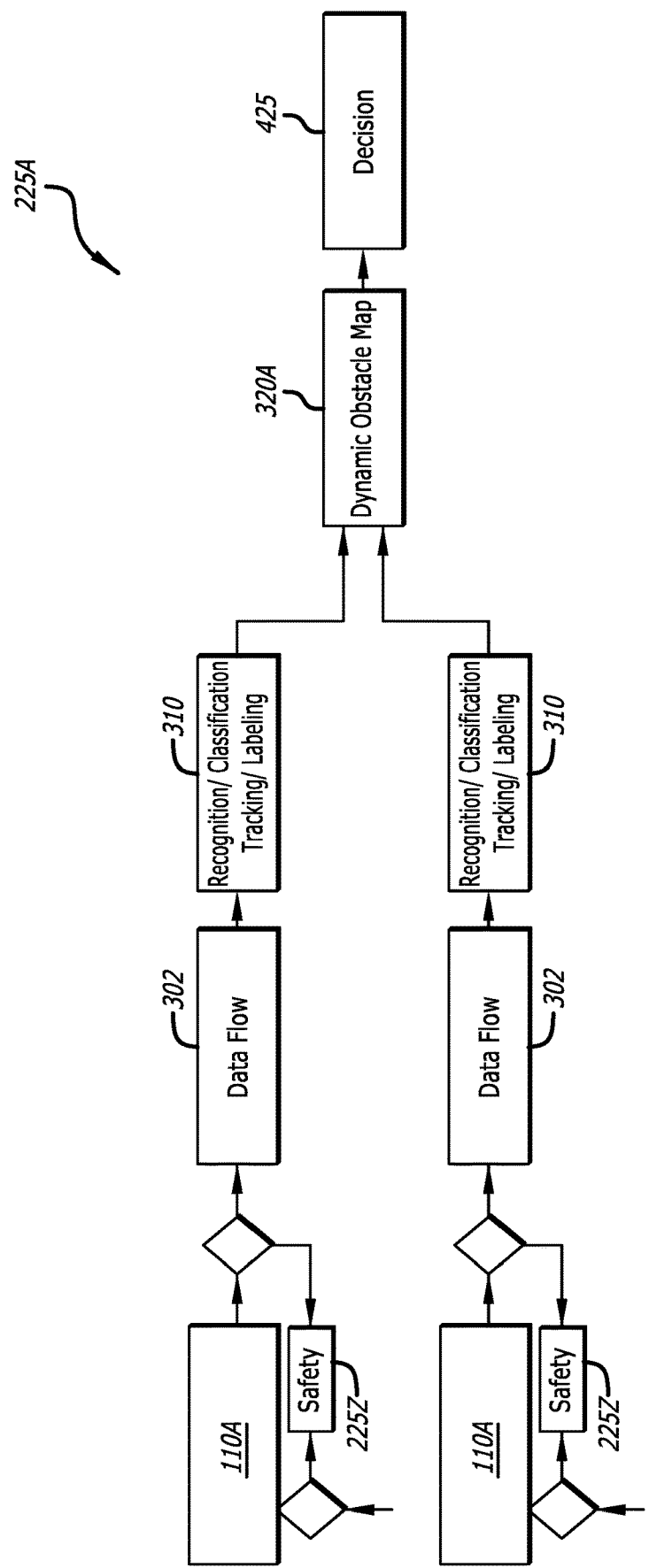
FIG. 4 depicts a functional block diagram of an example sensor system, in accordance with some example implementations.

FIG. 4 depicts a functional block diagram of an example sensor system 225A in which features consistent with the described subject matter may be implemented. As shown, the sensor system 225A includes sensors 110A (such as, but not limited to, two-dimensional LIDAR sensors). The sensors 110A may output data flows 302. At 310, the sensor system 225A may apply recognition, classification, tracking, and labeling processing to the data flows 302. The recognition, classification, tracking, and labeling processing may implement artificial intelligence to learn to recognize, classify, track, and label objects detected by the sensors 110A. The outputs of 310 may be fed into a dynamic obstacle map component 320A. The dynamic obstacle map component 320A may be configured to receive the recognition, classification, tracking, and labeling data and construct a dynamic obstacle map within a perception area of the sensors 110A. The dynamic obstacle map may include a number of potential obstacles along a route or field-of-view for the vehicle based on the data generated by the sensors 110A. After constructing the dynamic obstacle map, the sensor system 225A (e.g., the sensor data box 220A) may output a decision 425. The decision 425 may include a vehicle control decision which may be transmitted to the vehicle control system component 201 to implement the vehicle control decision (e.g., change a steering heading, change the speed of the vehicle, change an operation of the vehicle, or the like). As further illustrated in FIG. 4, the outputs of the sensors 110A may also be fed into a safety sensor system 225Z. The sensor system 225Z may provide an emergency failsafe to stop the vehicle if an object is detected within an area (e.g., an emergency area) within a threshold distance from the vehicle (e.g., within 5-30 feet of a front bumper). As those skilled the art will appreciate, the threshold distance may be less than 5 feet or the threshold distance may be varied depending on traffic density, weather, number of obstacles, and location (e.g., lower threshold distance in and around a destination (e.g., bus stop).

Figure 5:
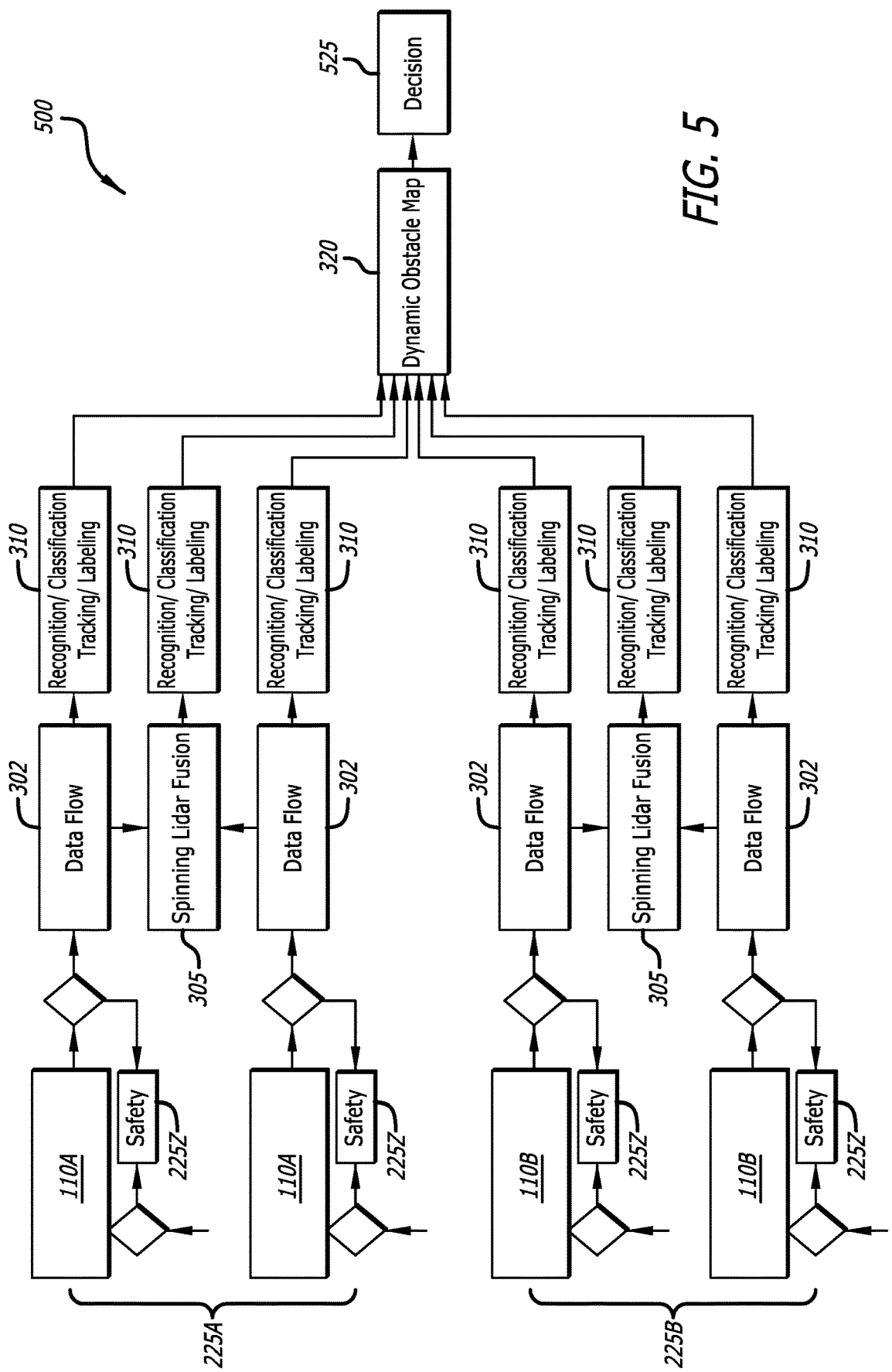
FIG. 5 depicts a functional block diagram of a vehicle control system including example sensor systems, consistent with implementations of the current subject matter.

FIG. 5 depicts a functional block diagram of a vehicle control system 500 including example sensor systems 225A and 225B in which features consistent with the described subject matter may be implemented. As shown, the sensor system 225A includes sensors 110A (such as, but not limited to, spinning LIDAR sensors) and the sensor system 225B includes sensors 110B (such as, but not limited to, 2D LIDAR sensors). The sensors 110A and 110B may output data flows 302. At 305, a processor of the sensor system 225 may combine or fuse data flows 302 from the sensors 110A and/or 110B. At 310, the sensor system 225 may apply recognition, classification, tracking, and labeling processing to the data flows 302 and/or the combined data flow 305. The recognition, classification, tracking, and labeling processing may implement artificial intelligence to learn to recognize, classify, track, and label objects detected by the sensors 110A and 110B. The outputs of 310 may be fed into a dynamic obstacle map component 320. The dynamic obstacle map component 320 may be configured to receive the recognition, classification, tracking, and labeling data and construct a dynamic obstacle map within a perception area of the sensors 110A and 110B. The dynamic obstacle map may include a number of potential obstacles along a route or field-of-view for the vehicle based on the data generated by the sensors 110A and 110B. After constructing the dynamic obstacle map, the sensor systems 225A and 225B (e.g., the sensor data box 220A and 220B) may output a decision 525. The decision 525 may include a vehicle control decision which may be transmitted to the vehicle control system component 201 to implement the vehicle control decision (e.g., change a steering heading, change the speed of the vehicle, change an operation of the vehicle, or the like). As further illustrated in FIG. 5, the outputs of the sensors 110B may also be fed into a safety sensor system 225Z. The sensor system 225Z may provide an emergency failsafe to stop the vehicle if an object is detected within a perception area (e.g., an emergency area) less than a threshold distance away from the vehicle (e.g., within 5-30 feet of a front bumper). As those skilled the art will appreciate, the threshold distance may be less than 5 feet or the threshold distance may be varied depending on traffic density, weather, number of obstacles, and location (e.g., lower threshold distance in and around a destination (e.g., bus stop).

Figure 6A:
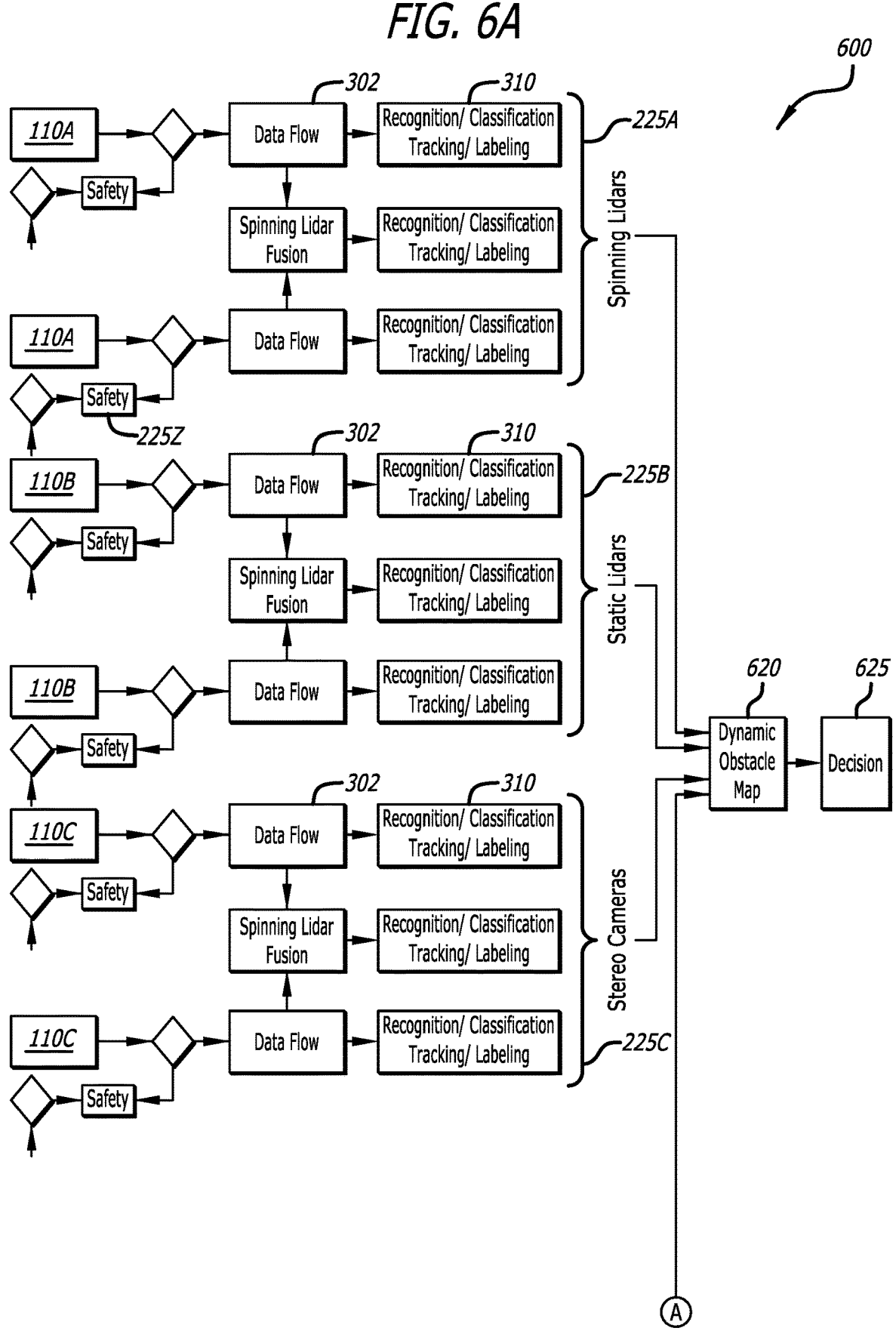
FIGS. 6A-6B depict a functional block diagram of a vehicle control system, consistent with implementations of the current subject matter.
Figure 6B:
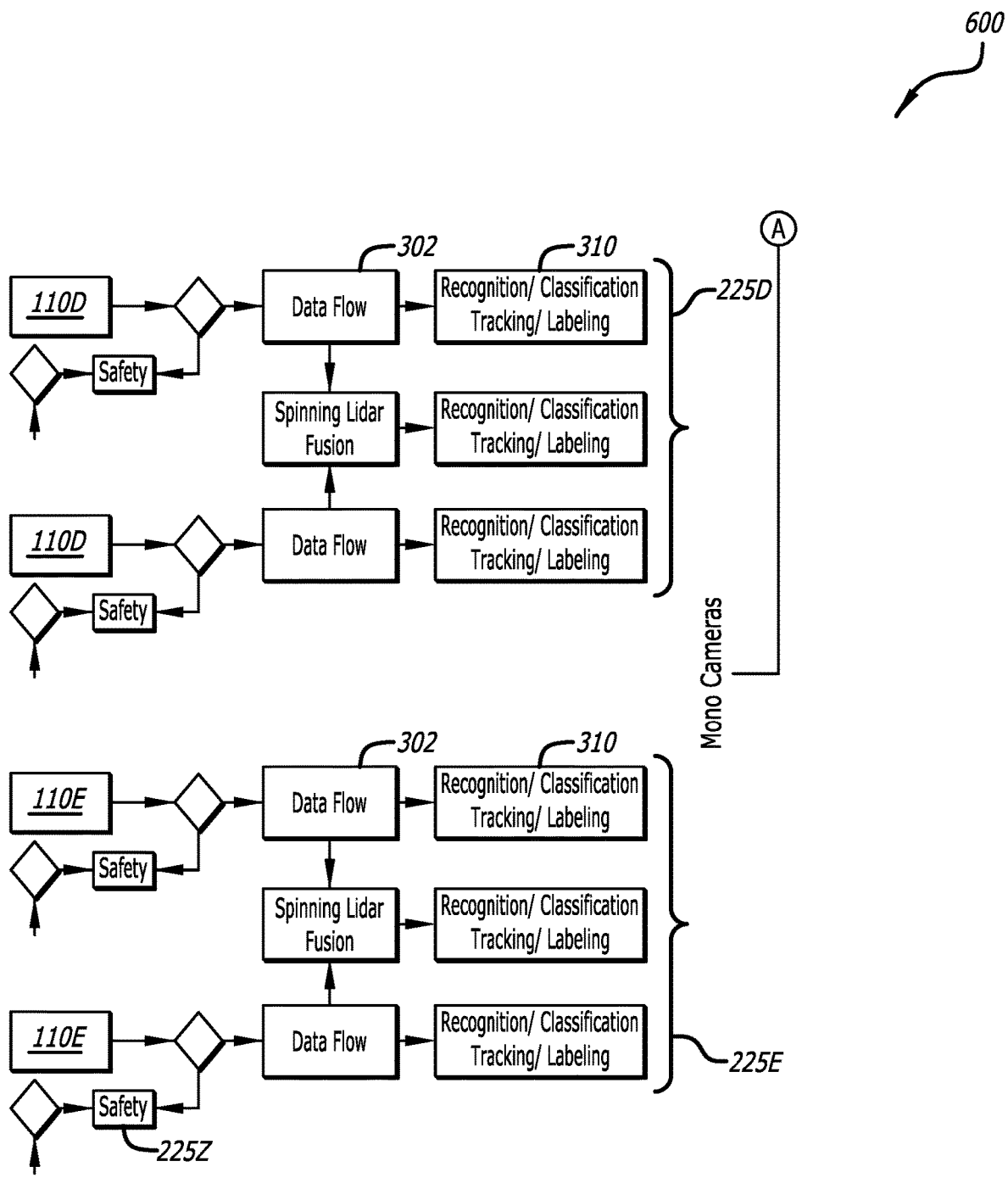

FIG. 6 depicts a functional block diagram of a vehicle control system 600 including example sensor systems 225A-225E in which features consistent with the described subject matter may be implemented. As shown, the sensor systems 225A-225E includes sensors 110A-E (e.g., spinning LIDAR sensors, static LIDAR sensors, stereo cameras, mono cameras, or the like). The sensors 110A-110E may output data flows 302. In some aspects, a processor of the sensor systems 225 may combine or fuse data flows 302 from one or more of the sensors 110A-110E. At 310, the sensor systems 225A-225E may apply recognition, classification, tracking, and labeling processing to the data flows 302 and/or the combined data flow. The recognition, classification, tracking, and labeling processing may implement artificial intelligence to learn to recognize, classify, track, and label objects detected by the sensors 110A-110E. The outputs of 310 may be fed into the dynamic obstacle map component 620. The dynamic obstacle map component 620 may be configured to receive the recognition, classification, tracking, and labeling data and construct a dynamic obstacle map within a perception area of the sensors 110A-110E. The dynamic obstacle map may include a number of potential obstacles along a route or field-of-view for the vehicle based on the data generated by the sensors 110A-110E. After constructing the dynamic obstacle map, the vehicle control system 600 may output a decision 625.

In some aspects, one or more of the sensor systems 225A-225E may independently construct a dynamic obstacle map 620 and/or a decision (e.g., decision 325, 425, 525, 625) for their system 225 and corresponding sensor 110. The independently constructed dynamic obstacle maps of the sensor systems 225A-225E may be outputted to the dynamic obstacle map component 620. The dynamic obstacle map component 620 may be configured to process the dynamic obstacle maps of the sensor systems 225A-225E to construct a composite dynamic obstacle map incorporating the data from the sensor systems 225A-225E. Based on the composite dynamic obstacle map, the dynamic obstacle maps of the sensor systems 225A-225E, and/or the decisions received from the sensor systems 225A-225E, the dynamic obstacle map component 620 may generate the decision 625.

The decision 625 may include a vehicle control decision which may be transmitted to the vehicle control system component 201 to implement the vehicle control decision (e.g., change a steering heading, change the speed of the vehicle, change an operation of the vehicle, or the like). The vehicle control system component 201 may include artificial intelligence configured to determine a priority or ranking of the sensor systems 225. For example, the vehicle control system component 201 may determine through past experience (e.g., through application of one or more machine learning or artificial intelligence algorithms, techniques, etc.) that certain sensor systems 225 perform better than others in certain environments. For example, certain sensors 110 may be more reliable during a certain time of day, under certain weather conditions, at certain distances, at certain speeds, or the like. The vehicle control system component 201 artificial intelligence may determine which vehicle control decision to implement based on the sensor system 225, the sensor 110, the environment of the vehicle, or the like, or any combination of the above. Additionally or alternatively, each sensor system 225 (e.g., sensor box 220) may include artificial intelligence configured to determine a performance of the sensor 110 and/or the sensor system 225. For example, the sensor box 220 may determine through past experience (e.g., through application of one or more machine learning or artificial intelligence algorithms, techniques, etc.) whether a vehicle control decision of the sensor system 225 was correct/accurate or not. For example, if the vehicle control system component 201 selects the sensor system's 225 vehicle control decision, the artificial intelligence algorithm may determine that the vehicle control decision of the sensor system 225 was correct/accurate.

As further illustrated in FIG. 6, the outputs of the sensors 110B may also be fed into a safety sensor system 225Z. The sensor system 225Z may provide an emergency failsafe to stop the vehicle if an object is detected within a perception area (e.g., an emergency area) less than a threshold distance away from the vehicle (e.g., within 5-30 feet of a front bumper).

Figure 7:
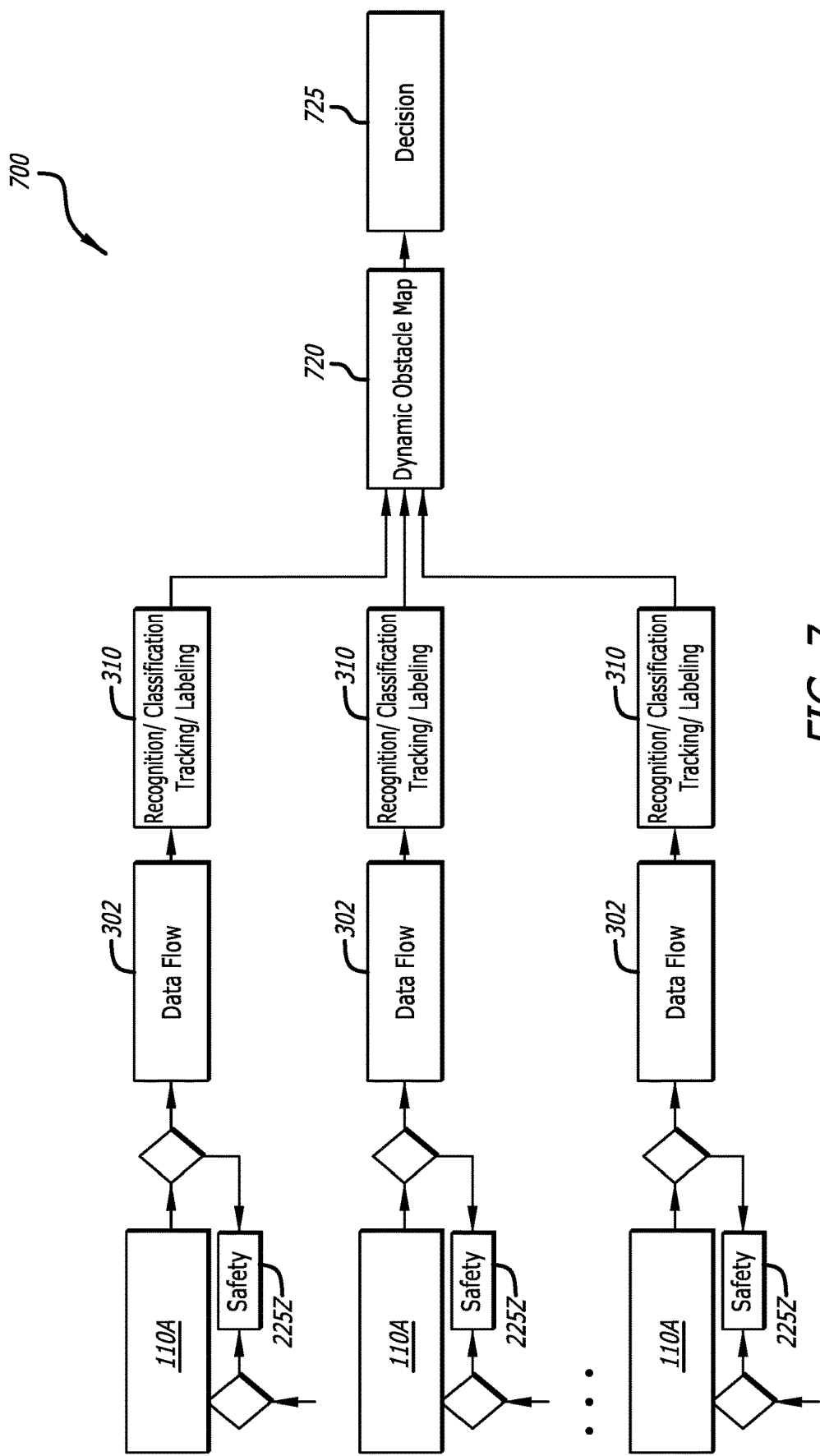
FIG. 7 depicts a functional block diagram of an example safety level in which features consistent with the described subject matter may be implemented.

FIG. 7 depicts a functional block diagram of an example safety level 700 in which features consistent with the described subject matter may be implemented. As shown, the safety level 700 includes sensors 110A (e.g., static two-dimensional (2D) LIDAR sensors or another sensor). The sensors 110A may output data flows 302. At 310, the safety level 700 may apply recognition, classification, tracking, and labeling processing to the data flows 302. The recognition, classification, tracking, and labeling processing may implement artificial intelligence to learn to recognize, classify, track, and label objects detected by the sensors 110A. The outputs of 310 may be fed into a dynamic obstacle map component 720. The dynamic obstacle map component 720 may be configured to receive the recognition, classification, tracking, and labeling data and construct a dynamic obstacle map within a perception area of the sensors 110A. The dynamic obstacle map may include a number of potential obstacles along a route or field-of-view for the vehicle based on the data generated by the sensors 110A. After constructing the dynamic obstacle map, the sensor system 225A (e.g., the sensor data box 220A) may output a decision 725. The decision 725 may include a vehicle control decision which may be transmitted to the vehicle control system component 201 to implement the vehicle control decision (e.g., change a steering heading, change the speed of the vehicle, change an operation of the vehicle, or the like). As further illustrated in FIG. 7, the outputs of the sensors 110A may also be fed into a safety sensor system 225Z. The sensor system 225Z may provide an emergency failsafe to stop the vehicle if an object is detected within an area (e.g., an emergency area) within a threshold distance from the vehicle (e.g., within 5-30 feet of a front bumper). The safety level 700 may monitor the status of all perception sensors (e.g., sensor systems 225A-225Z). The safety level 700 may also include its own perception sensors (e.g., sensors 110A shown in FIG. 7). The safety level 700 may not be configured to drive the vehicle but may be configured to stop the vehicle safely in the event of any anomaly detected (e.g., within the emergency area). The safety level 700 may stop the vehicle safely in response to data (e.g., sensor data, a vehicle control decision, or the like) from one or more sensors 110 and/or one or more sensor systems 225.

Figure 8:
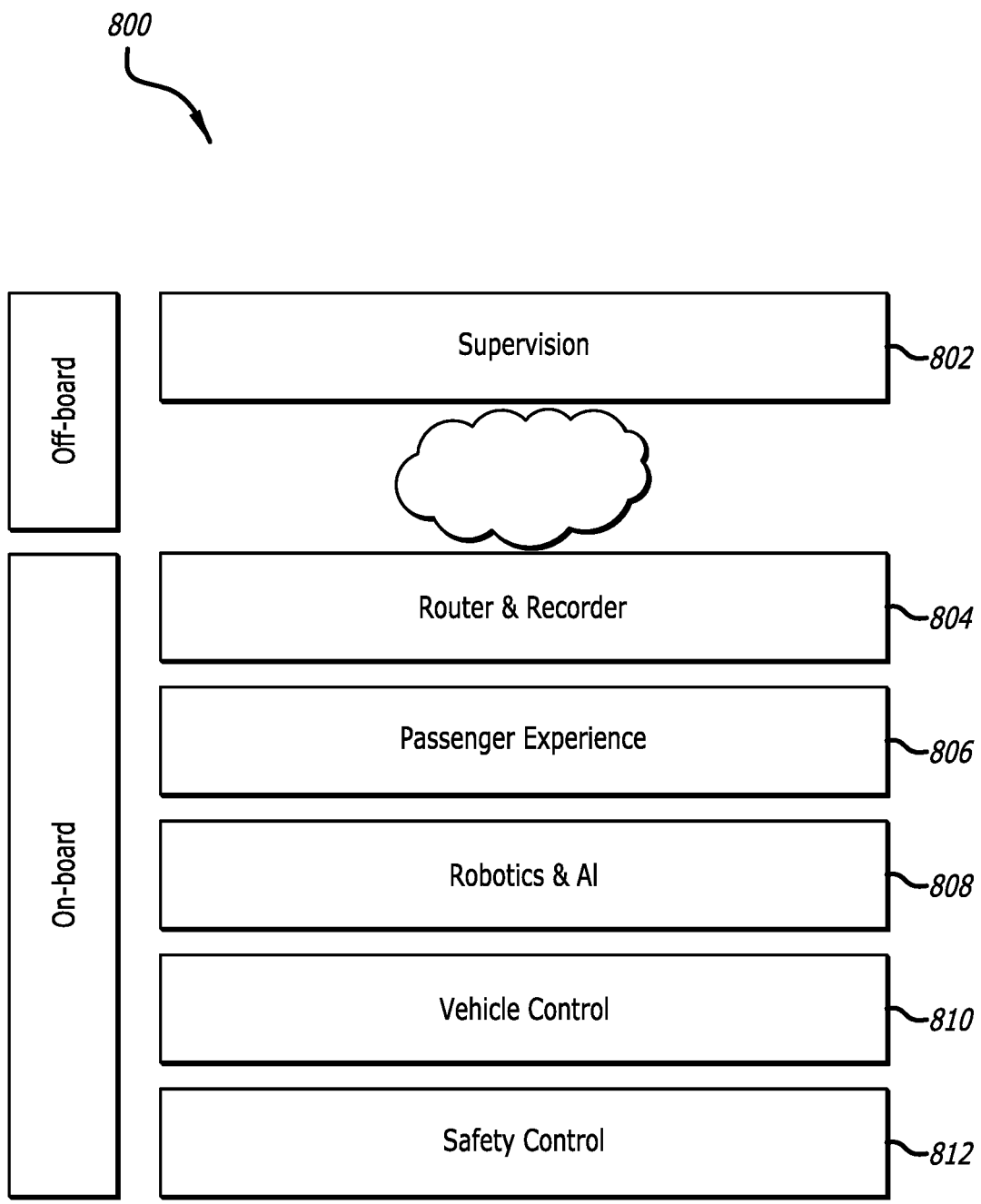
FIG. 8 depicts a system having six different interconnected levels of software and hardware, in accordance with some example implementations.

FIG. 8 depicts a system 800 having six different interconnected levels of software and hardware, in accordance with some example implementations. As shown, the system 800 includes off-board (e.g., off-vehicle) and on-board levels. The off-board level includes a supervision level 802 which may include a cloud service that provides support and management services to sites equipped with the vehicle control system technology and vehicles. The supervision level may provide the functions of: having a human in the loop of vehicle control; mapping, routes, and data; fleet or vehicle management; and passenger information.

As shown, the onboard levels include a router and recorder level 804, a passenger experience level 806, a robotics and artificial intelligence (AI) level 808, if vehicle control level 810, and a safety control level 812. The router and recorder level 804 may include a software router which may be controlled by the Robotics & AI level 808 and a hardware router system which may include routing to available communication media with redundant networks. An on-board software router module may be embedded in the software of the Robotics & AI level 808. This router module may transfer data between modules located inside the Robotics & AI level 808 and with other levels such as the safety level 812, the passenger experience level 806, and the supervision level 802 or vehicle-to-vehicle modules. The hardware router system may include onboard hardware that provides redundant communication to different levels of the vehicle (e.g., the passenger experience level 806 via Wi-Fi/4G/5G and the Robotics & AI level 808 via GPRS/RSRC or a dedicated 5.5 GHz radio, or the like).

The passenger experience level 806 may be designed to provide a user-friendly experience for both passengers and other road users. For example, the vehicle design may include a shuttle, van, cart, or the like design in order to transport a quantity of passengers in a safe and comfortable manner (e.g., in a manner that may limit acceleration, braking, and turning g-forces so the passengers don't get jostled).

The passenger experience level 806 may include an onboard touchscreen to provide information to the passengers and/or provide adjustable controls for the vehicle (e.g., air conditioning, music, video information, emergency vehicle control or alerts, or the like).

The Robotics & AI level 808 may manage the autonomous functions of the vehicle control system. Robotics & AI level 808 may include vehicle control systems 200, 500, and 600 of FIGS. 2, 5, and 6. Hardware components of the Robotics & AI level 808 may include redundant perception sensors, such as sensors 110 (e.g., LIDAR sensors, cameras, optical sensors, INS, GNSS, odometry, or the like) to provide redundancy in terms of field-of-view and technology. The Robotics & AI level 808 may provide the following functions: localization of the vehicle; obstacle detection; mission manager; routing; path finder; communication router; and a control command. In some aspects, any default in the Robotics & AI level 808 may trigger an emergency brake or safety procedure. In some aspects, each sensor or sensor system may provide a confidence index level for location/position information regarding the vehicle or objects along the route. The confidence index level may be recorded and used by the artificial intelligence system to learn if the confidence index levels (in corresponding sensors) are reliable for a given trip or environment.

The vehicle control level 810 may control the function of the vehicle and may actuate and control all functions and features (e.g., steering, power, braking, or the like) of the vehicle. The vehicle control level 810 may receive speed and steering angle orders from the Robotics & AI level 808 and may receive commands from the safety level 812 in case of an emergency stop. For example, the vehicle control level 810 may include the vehicle control system component 201.

The safety control level 812 may include an independent software stack that manages a safety area located in front of the vehicle (e.g., the emergency area). The safety control level 812 may include the safety level 700. The safety (emergency) area may be a cone-shaped area whose size depends on the speed, localization, and vehicle mode. For example, when the vehicle is in a docking mode, the safety area may be a short distance around the vehicle and the speed is very low. When the vehicle is driving at speed, the safety area may be larger, and its size may be defined by the ability of the emergency stop system to stop the vehicle before impacting an obstacle with a predefined maximum deceleration.

Figure 9:
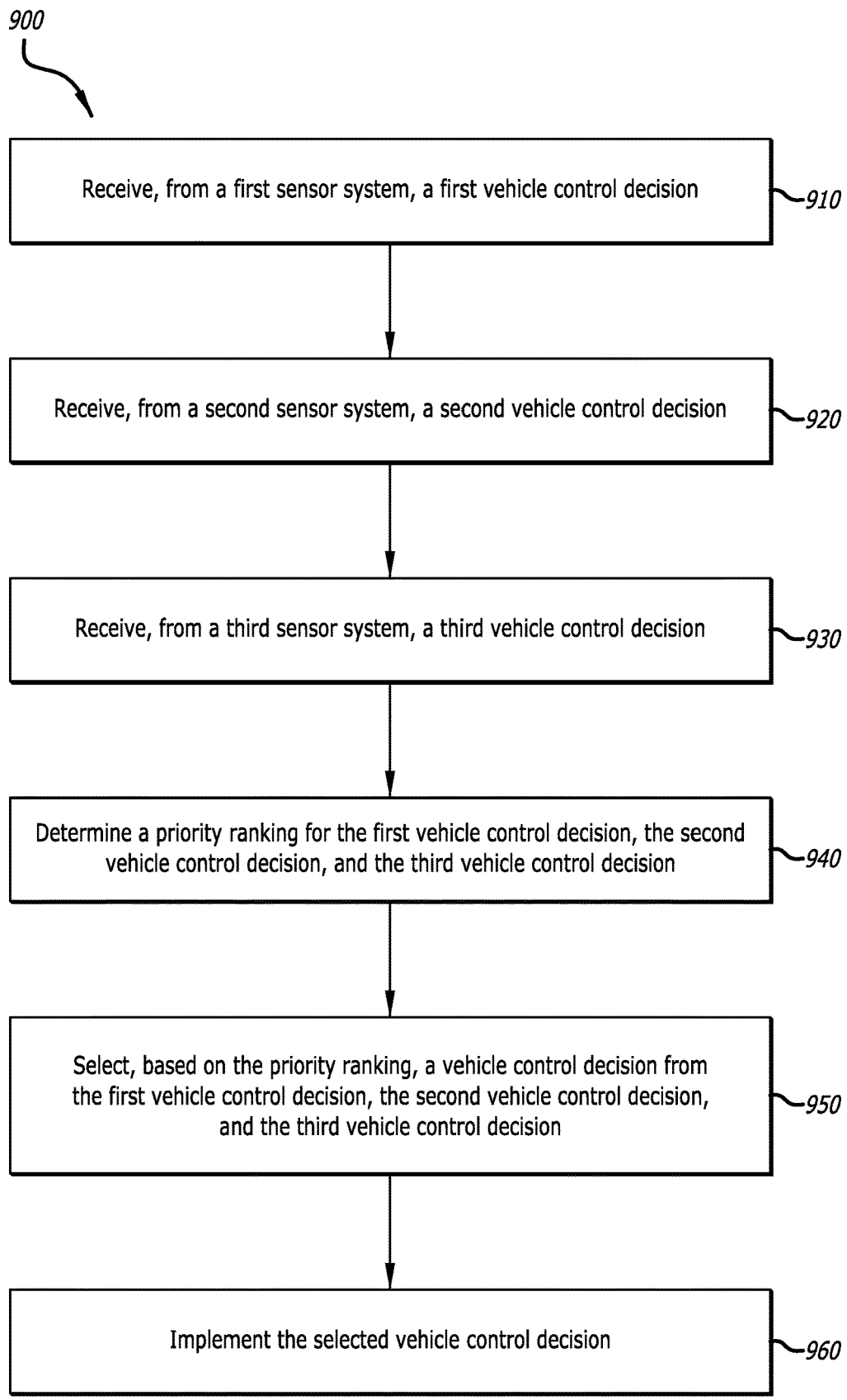
FIG. 9 depicts a flowchart illustrating a process for multi-layered autonomous vehicle control, in accordance with some example implementations.

FIG. 9 depicts a flowchart illustrating a process 900 for multi-layered autonomous vehicle control, in accordance with some example implementations. Referring to FIGS. 1-3, the process 400 may be performed by a computing apparatus such as, for example, the sensor system 225, the vehicle control system 200, 500, 600, the vehicle control system component 201, the sensor box 220, the computing apparatus 1000, and/or the like.

At operational block 910, the apparatus 1000, for example, may, receive, from a first sensor system, a first vehicle control decision. For example, the apparatus 1000 may receive a first vehicle control decision from sensor system 225A. The sensor system 225A (e.g., via the sensor data box 220A) may generate the first vehicle control decision based on data received from a first sensor 110A (e.g., a static two-dimensional (2D) LIDAR sensor) and independent of any other sensor 110 and/or sensor system 225.

At operational block 920, the apparatus 1000, for example, may, receive, from a second sensor system, a second vehicle control decision. For example, the apparatus 1000 may receive a second vehicle control decision from sensor system 225B. The sensor system 225B (e.g., via the sensor data box 220B) may generate the second vehicle control decision based on data received from a second sensor 110B (e.g., a spinning LIDAR sensor) and independent of any other sensor 110 and/or sensor system 225. The second vehicle control decision may include a change to the speed, steering direction, or the like of the vehicle At operational block 930, the apparatus 1000, for example, may, receive, from a third sensor system, a third vehicle control decision. For example, the apparatus 1000 may receive a third vehicle control decision from sensor system 225Z. The sensor system 225Z (e.g., the safety level 700) may generate the third vehicle control decision based on data received from a second sensor 110B (e.g., a spinning LIDAR sensor) and independent of any other sensor 110 and/or sensor system 225. The third vehicle control decision may include applying an emergency brake (or other braking system) to the vehicle to stop the vehicle.

At operational block 940, the apparatus 1000, for example, may, determine a priority ranking where the first vehicle control decision, second vehicle control decision, and the third vehicle control decision. For example, the vehicle control system component 201 may determine which vehicle control decision and/or sensor system 225 to use to control the vehicle. The vehicle control system component 201 may utilize artificial intelligence to determine which sensors or sensor systems 225 are more reliable under different environments (e.g., weather conditions, traffic conditions, or the like) over time. For example, the vehicle control system component 201 may determine that some LIDAR sensors may degrade in snow, fog, rain, and high dust particle conditions and the vehicle control system component 201 may determine that in those conditions, it should rely more on (e.g., rank higher) other sensor technology (e.g., radar, ultrasonic, optical sensors, or the like) if the sensor technologies differ in terms of object detection or other functions.

At operational block 950, the apparatus 1000, for example, may select, based on the priority ranking, a vehicle control decision from the first vehicle control decision, second vehicle control decision, and the third vehicle control decision. For example, in response to ranking the spinning LIDAR system 225B higher than other sensor systems 225, the apparatus 1000 may select the second vehicle control decision. While three vehicle control decisions and three sensor systems 225 are described herein, more or fewer vehicle control decisions and sensor systems 225 are possible.

At operational block 960, the apparatus 1000, for example, may implement the selected vehicle control decision. For example, the vehicle control system component 201 may, in response to selecting the second vehicle control decision, implement the second vehicle control decision. The second vehicle control decision may include instructions to alter the speed, steering direction, and/or function of the vehicle (e.g., change a steering heading, change the speed of the vehicle, change an operation of the vehicle, or the like).

Figure 10:
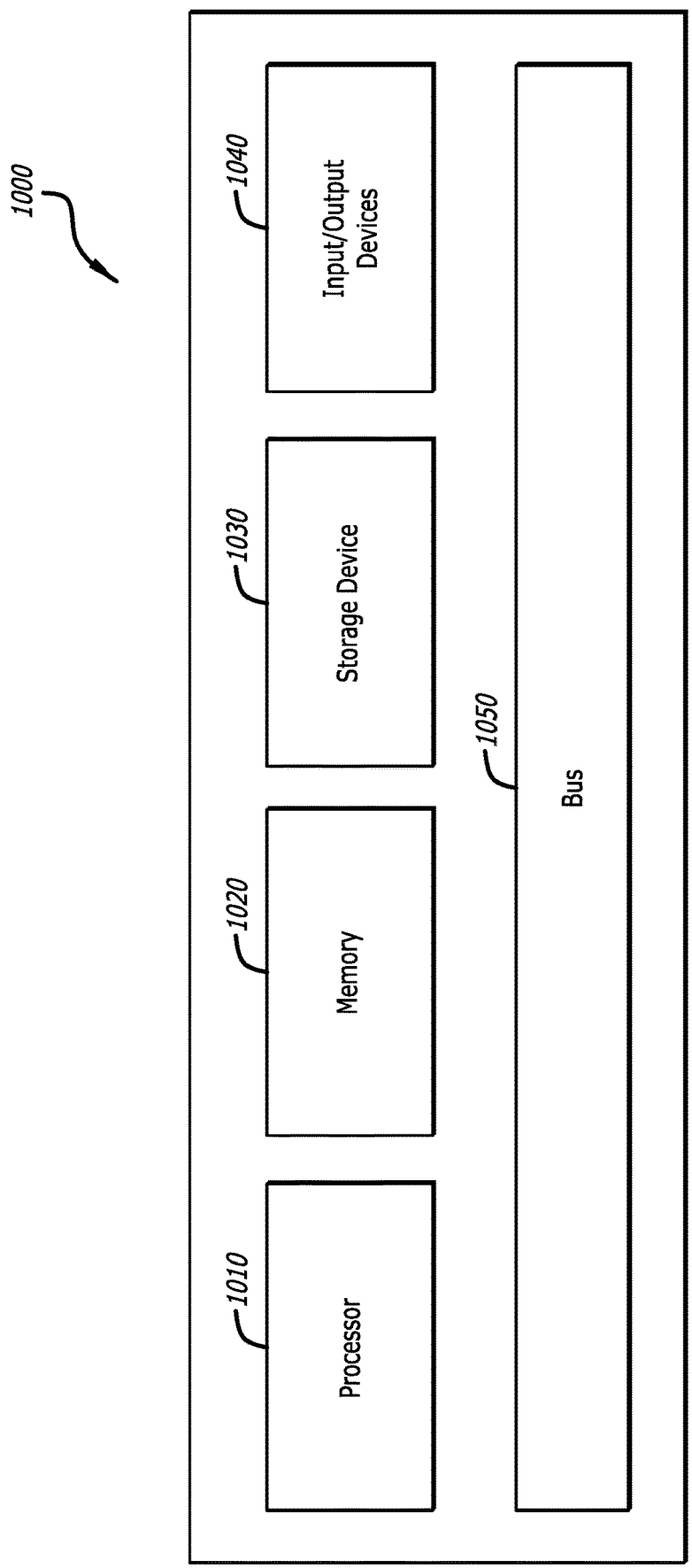
FIG. 10 depicts a block diagram illustrating a computing apparatus consistent with implementations of the current subject matter.

FIG. 10 depicts a block diagram illustrating a computing apparatus 1000 consistent with implementations of the current subject matter. Referring to FIGS. 1-4, at least a portion of the computing apparatus 1000 may be used to implement at least a portion of the computing system 100, an apparatus providing the data aggregator pipeline 220, an apparatus providing the data processing framework 320, a server, the process 400 and/or the like.

As shown in FIG. 10, the computing apparatus 1000 may include a processor 1010, a memory 1020, a storage device 1030, and input/output devices 1040. The processor 1010, the memory 1020, the storage device 1030, and the input/output devices 1040 may be interconnected via a system bus 1050. The processor 1010 may be capable of processing instructions for execution that may implement operations consistent with those described herein. Such executed instructions may be implemented by one or more components of, for example, the sensor system 225, the vehicle control system 200, 500, 600, the vehicle control system component 201, the sensor box 220. In some example implementations, the processor 1010 may be a single-threaded processor. Alternately, the processor 1010 may be a multi-threaded processor. The processor 1010 may be capable of processing instructions stored in the memory 1020 and/or on the storage device 1030 to display graphical information for a user interface provided via the input/output device 1040.

The memory 1020 may be a computer readable medium such as volatile or non-volatile that stores information within the computing apparatus 1000. The memory 1020 may store data structures representing configuration object databases, for example. The storage device 1030 is capable of providing persistent storage for the computing apparatus 1000. The storage device 1030 may be a floppy disk device, a hard disk device, an optical disk device, or a tape device, or other suitable persistent storage means. The input/output device 1040 provides input/output operations for the computing apparatus 1000. In some example implementations, the input/output device 1040 may include a keyboard, a pointing device, and/or sensors internal or external to the computing apparatus 1000. In various implementations, the input/output device 1040 includes a display unit for displaying graphical user interfaces. In some aspects, a visual display of one or more table aspects may be based on table size, table usage/lock history, for read and/or write functions, and table load status history. In some aspects, for each pass/period/run of a decision process described herein, one pixel may be reserved for each individual table. The color value of the pixel may be made up of the following table properties: 2 bits for actual read locking; 1 bit for write locking; 1 bit for the load status (loaded, unloaded); and some bits for the table size.

According to some example implementations, the input/output device 1040 may provide input/output operations for a network device. For example, the input/output device 1040 may include Ethernet ports or other networking ports to communicate with one or more wired and/or wireless networks (e.g., a local area network (LAN), a wide area network (WAN), the Internet). The input/output device 1040 may include one or more antennas for communication over the network with the computing systems. Wireless networks may include Wi-Fi, WiMAX, and cellular networks (2G/3G/4G/5G), and/or any other wireless network.

In some example implementations, the computing apparatus 1000 may be used to execute various interactive computer software applications that may be used for organization, analysis and/or communication of data in various formats. Alternatively, the computing apparatus 1000 may be used to execute any type of software applications. These applications may be used to perform various functionalities, e.g., vehicle control functionalities (e.g., detecting object, determining routes, changing speed, changing direction, and/or any other functionality, etc.), computing functionalities, communications functionalities, etc. The applications may include various add-in functionalities or may be stand-alone computing products and/or functionalities. Upon activation within the applications, the functionalities may be used to generate the user interface provided via the input/ output device 1040. The user interface may be generated and presented to a user by the computing apparatus 1000 (e.g., on a computer screen monitor, etc.).

In some implementations, a machine learning model of a machine learning system may evaluate the impact of an environment of the vehicle on the sensors 110 and/or the sensor systems 225. The model may assume that the future use of the sensor system 225 in certain conditions is not significantly different from historic performance of the sensor system 225. If so, then the algorithm may make more accurate decisions for selecting vehicle control decisions from the different sensor systems 225. If the usage or performance changes significantly, further training may allow the algorithm to adapt to the changed usage and/or performance.

The machine learning system may include a neural network. The machine learning system may be trained in an unsupervised or supervised manner. In some implementations, for all considered allocations, the history of different aspects of memory usage, decisions, decision outcomes and/or the like may be recorded. This history may include the vehicle control decisions, change in vehicle functionality, object detection, or the like. The respective values may be retrieved periodically by a system process and recorded in the history on a rolling basis. The machine learning system may be trained to distinguish between different environments, traffic conditions, and/or weather conditions.

Training the decision algorithm may involve using the different historical aspects of the sensor systems 225 and/or vehicle control systems 500, 600, 800. For example, training may involve historical decisions to select (or rank) a vehicle control decision over another. If an object is detected in the path of the vehicle later on, then it may indicate that the decision was wrong. If the one or more objects along the route of a vehicle were confirmed by other sensor systems 225, then the machine learning system may determine that a decision was likely correct. In some aspects, it may be advantageous to update algorithms or models for making vehicle control decision selections and ranking.

One or more aspects or features of the subject matter described herein may be realized in digital electronic circuitry, integrated circuitry, specially designed ASICs, field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example, as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A control system for an autonomous vehicle, comprising: a first sensor system including a first sensor and a first data box, the first sensor system configured to determine a first vehicle control decision, the first vehicle control decision modifying a function or operation of the autonomous vehicle; a second sensor system including a second sensor and a second data box, the second sensor system configured to determine a second vehicle control decision, the second vehicle control decision modifying a function or operation of the autonomous vehicle; a controller configured to: receive the first vehicle control decision and the second vehicle control decision from the first sensor system and the second sensor system; determine a priority ranking for the first vehicle control decision and the second vehicle control decision; select, based on the priority ranking, a vehicle control decision from the first vehicle control decision and the second vehicle control decision; and implement the selected vehicle control decision, wherein the selected vehicle control decision comprises changing a speed or a steering direction of the autonomous vehicle, wherein the controller is configured to implement the selected vehicle decision based solely on the first vehicle control decision from the first sensor system or to implement the selected vehicle decision based solely on the second vehicle control decision from the second sensor system.

2. The system of claim 1, further comprising a safety control system configured to generate, responsive to a sensor detecting an object within a threshold distance of the autonomous vehicle, a third vehicle control decision, wherein the third vehicle control decision is configured to stop the autonomous vehicle.

3. The system of claim 2, wherein the controller is further configured to determine the priority ranking based on a historical performance of the first sensor system, the second sensor system, the safety sensor system, and/or input from an environment of the autonomous vehicle.

4. The system of claim 1, wherein the first data box is configured to: process data from the first sensor; detect one or more objects within a range of the first sensor; construct, responsive to the detecting, a dynamic obstacle map including detected one or more objects; determine, responsive to the constructing and based on a first algorithm, the first vehicle control decision, the vehicle control decision modifying a function or operation of the autonomous vehicle.

5. The system of claim 4, wherein the second data box is configured to: process data from the second sensor; detect one or more objects within a range of the second sensor; construct, responsive to the detecting, a dynamic obstacle map including detected one or more objects; determine, responsive to the constructing and based on a second algorithm, the second vehicle control decision, the second vehicle control decision modifying a function or operation of the autonomous vehicle.

6. The system of claim 5, wherein the first algorithm differs from the second algorithm.

7. The system of claim 6, wherein the first sensor or the second sensor is a static LIDAR sensor, a spinning LIDAR sensor, an optical sensor, a radar sensor, a motion sensor, an inertial sensor, a camera, or any combination thereof.

8. The system of claim 5, wherein the first vehicle control decision is based on data detected by the first sensor, and wherein the second vehicle control decision is based on data detected by the second sensor.

9. A method for autonomously controlling a vehicle, the method comprising: receiving, by at least one processor from a first sensor system, a first vehicle control decision; receiving, by the at least one processor from a second sensor system, a second vehicle control decision; determining, by the at least one processor, a priority ranking for the first vehicle control decision and the second vehicle control decision when the at least one processor receives the first vehicle control decision and the second vehicle control decision; selecting, based on the priority ranking, a vehicle control decision from the first vehicle control decision and the second vehicle control decision; and implementing, responsive to the determining, the selected vehicle control decision, wherein the selected vehicle control decision comprises changing a speed or a steering direction of the vehicle; and implementing, responsive to the determining, the selected vehicle control decision based solely on the first vehicle control decision from the first sensor system or solely on the second vehicle control decision.

10. The method of claim 9, further comprising receiving, by the at least one processor from a third sensor system, a third vehicle control decision, wherein the third vehicle control decision is configured to stop the vehicle in an emergency.

11. The method of claim 10, wherein the third sensor system comprises a safety control system configured to stop the vehicle responsive to detecting an object within a threshold distance of the vehicle, the third vehicle control decision instructing the at least one processor to stop the vehicle.

12. The method of claim 9, wherein determining the priority ranking is based on a historical performance of the first sensor system, the second sensor system, a third sensor system, and/or an environment of the vehicle.

13. The method of claim 9, wherein receiving the first vehicle control decision comprises receiving the first vehicle control decision from a first data box of the first sensor system.

14. The method of claim 9, wherein the first vehicle control decision is based on data detected by a first sensor, and wherein the second vehicle control decision is based on data detected by a second sensor.

15. The method of claim 14, wherein the first sensor or the second sensor is a static LIDAR sensor, a spinning LIDAR sensor, an optical sensor, a radar sensor, a motion sensor, an inertial sensor, a camera, or any combination thereof.

16. A non-transitory computer readable medium storing instructions which, when executed by at least one processor, cause operations comprising:
receiving, by the at least one processor from a first sensor system, a first vehicle control decision;
receiving, by the at least one processor from a second sensor system, a second vehicle control decision;
determining, by the at least one processor, a priority ranking for the first vehicle control decision and the second vehicle control decision;
selecting, based on the priority ranking, a vehicle control decision from the first vehicle control decision and the second vehicle control decision;
implementing, responsive to the determining, the selected vehicle control decision, wherein the selected vehicle control decision comprises changing a speed or a steering direction of the vehicle; and implementing, responsive to the determining, the selected vehicle control decision based solely on the first vehicle control decision from the first sensor system or solely on the second vehicle control decision.

17. The non-transitory computer readable medium storing instructions of claim 16, further comprising:

receiving, by the at least one processor from a third sensor system, a third vehicle control decision, wherein the third vehicle control decision is configured to stop the vehicle in an emergency.

* * * * *